US012315669B2

(12) United States Patent
Arai et al.

(10) Patent No.: US 12,315,669 B2
(45) Date of Patent: May 27, 2025

(54) INDUCTOR

(71) Applicant: Murata Manufacturing Co., Ltd., Kyoto-fu (JP)

(72) Inventors: Takumi Arai, Nagaokakyo (JP); Motoki Toyama, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 651 days.

(21) Appl. No.: 17/703,597

(22) Filed: Mar. 24, 2022

(65) Prior Publication Data

US 2022/0310313 A1 Sep. 29, 2022

(30) Foreign Application Priority Data

Mar. 26, 2021 (JP) ................................ 2021-054100
Mar. 26, 2021 (JP) ................................ 2021-054101

(51) Int. Cl.

| | |
|---|---|
| ***H01F 27/29*** | (2006.01) |
| ***H01F 27/25*** | (2006.01) |
| ***H01F 27/255*** | (2006.01) |
| ***H01F 27/26*** | (2006.01) |

(52) U.S. Cl.
CPC ......... *H01F 27/292* (2013.01); *H01F 27/255* (2013.01); *H01F 27/266* (2013.01)

(58) Field of Classification Search
CPC ..... H01F 27/292; H01F 27/255; H01F 27/266
See application file for complete search history.

(56) References Cited

U.S. PATENT DOCUMENTS

| | | | | |
|---|---|---|---|---|
| 6,106,893 | A * | 8/2000 | Uchikoba | H01F 17/06 427/407.1 |
| 11,361,897 | B2 * | 6/2022 | Yan | H01F 27/29 |
| 2007/0109087 | A1 * | 5/2007 | Kawarai | H01F 17/04 336/200 |
| 2017/0053732 | A1 * | 2/2017 | Moon | H01F 17/04 |
| 2019/0272945 | A1 * | 9/2019 | Arai | H01F 27/28 |
| 2020/0090850 | A1 * | 3/2020 | Isobe | H01F 27/292 |
| 2020/0294712 | A1 * | 9/2020 | Kim | H01F 27/32 |
| 2021/0375519 | A1 * | 12/2021 | Wang | H01F 17/04 |

FOREIGN PATENT DOCUMENTS

| | | | |
|---|---|---|---|
| JP | 2000323336 | A * | 11/2000 |
| JP | 2019-153642 | A | 9/2019 |

* cited by examiner

*Primary Examiner* — Malcolm Barnes
(74) *Attorney, Agent, or Firm* — Studebaker Brackett PLLC

(57) ABSTRACT

An inductor is configured to keep an inductance value within an allowable range of a specification. The inductor includes a conductor embedded in a core containing magnetic powder. The core includes a mounting surface facing a mounting substrate side at the time of mounting, an upper surface facing the mounting surface, a pair of end surfaces orthogonal to the mounting surface, and a pair of side surfaces orthogonal to the mounting surface and the pair of end surfaces. The conductor includes a conductive wire portion extending inside the core over the pair of end surfaces, and an electrode portion led out from each of the end surfaces and extending along the end surface and the mounting surface. The conductive wire portion is curved toward the mounting surface side in side view when the core is viewed from the side surface.

2 Claims, 11 Drawing Sheets

INDUCTOR

CROSS-REFERENCE TO RELATED APPLICATIONS

This application claims benefit of priority to Japanese Patent Application No. 2021-054100, filed Mar. 26, 2021, and to Japanese Patent Application No. 2021-054101, filed Mar. 26, 2021, the entire contents of each are incorporated herein by reference.

BACKGROUND

Technical Field

The present disclosure relates to an inductor.

Background Art

Japanese Patent Application Laid-Open No. 2019-153642 discloses a surface-mounted inductor including a molded body made of a composite material containing magnetic powder, and a metal plate including a first metal plate portion embedded in the molded body and a second metal plate portion extending from an end portion of the first metal plate portion to the outside of the molded body. The second metal plate portion is extended from a side surface or a mounting surface side of the molded body, disposed along the molded body with a bent portion, and forms an external terminal disposed at least on the mounting surface side of the molded body.

SUMMARY

In an inductor having a configuration in which a conductive wire portion extending linearly is embedded in a core as in Japanese Patent Application Laid-Open No. 2019-153642, there is a problem that an inductance value deviates from an allowable range of a specification due to deformation of the conductive wire portion during molding of the core or the like.

Accordingly, the present disclosure provides an inductor capable of keeping an inductance value within an allowable range of a specification.

According to an aspect of the present disclosure, there is provided an inductor in which a conductor is embedded in a core containing magnetic powder, in which the core includes a mounting surface facing a mounting substrate side at a time of mounting, an upper surface facing the mounting surface, a pair of end surfaces orthogonal to the mounting surface, and a pair of side surfaces orthogonal to the mounting surface and the pair of end surfaces. The conductor includes a conductive wire portion extending inside the core over the pair of end surfaces, and an electrode portion led out from each of the end surfaces and extending along the end surface and the mounting surface. The conductive wire portion is curved toward the mounting surface side in side view when the core is viewed from the side surface.

According to the present disclosure, the inductance value can be kept within the allowable range of the specification.

DETAILED DESCRIPTION

Hereinafter, embodiments of the present disclosure will be described with reference to the drawings.

Figure 1:
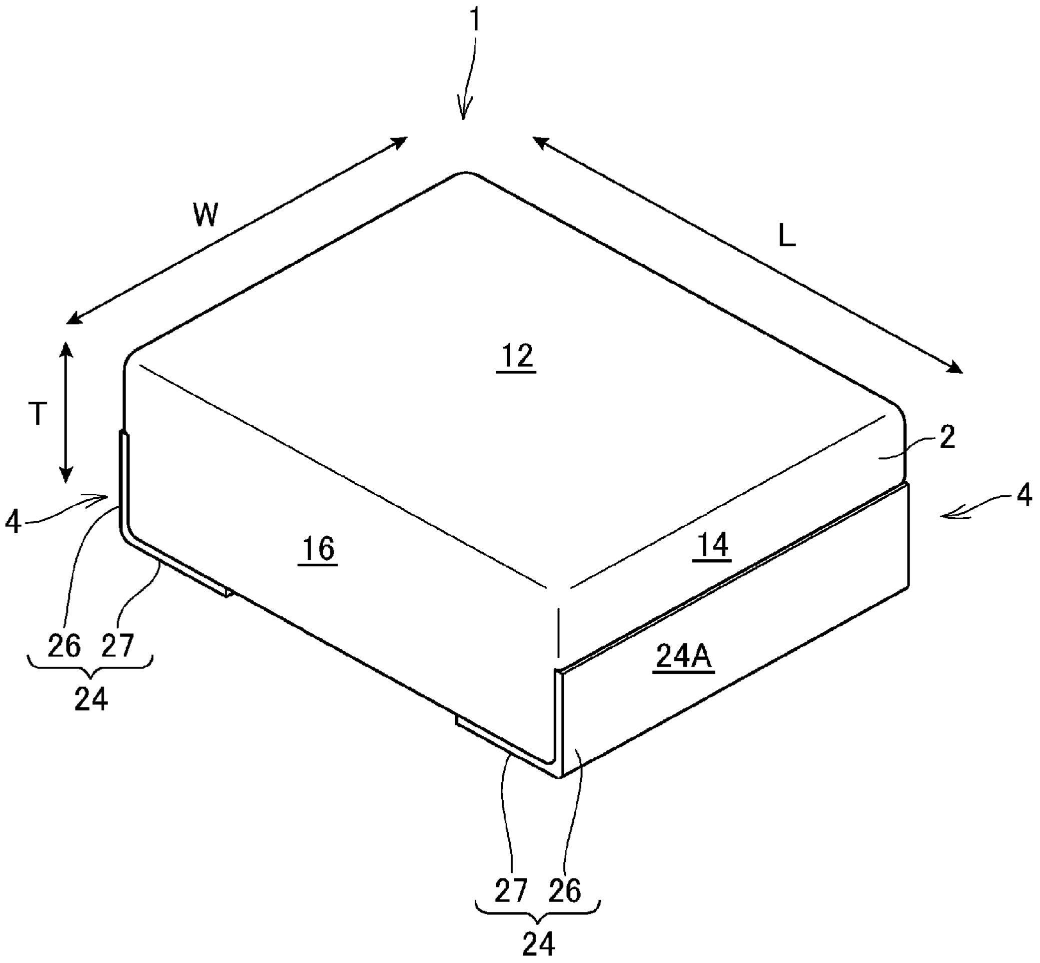
FIG. 1 is a perspective view when an inductor according to a first embodiment of the present disclosure is viewed from an upper surface side.
Figure 2:
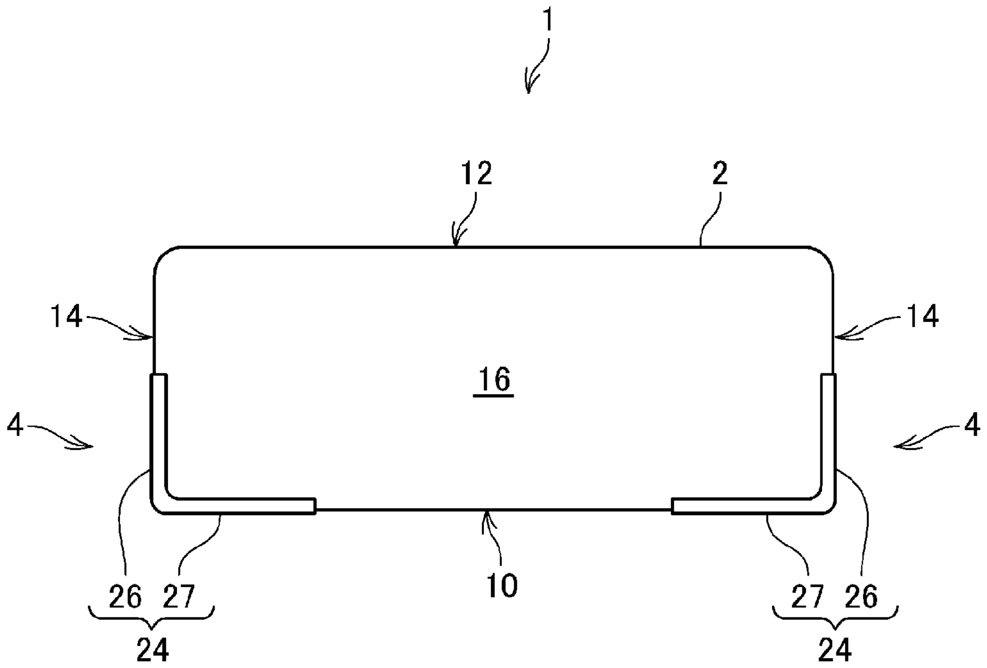
FIG. 2 is a plan view of a side surface of the inductor.
Figure 3:
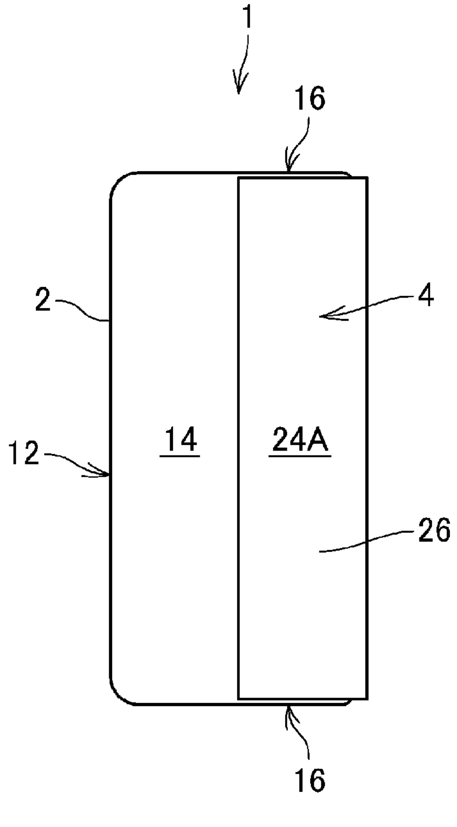
FIG. 3 is a plan view of an end surface of the inductor.
Figure 4:
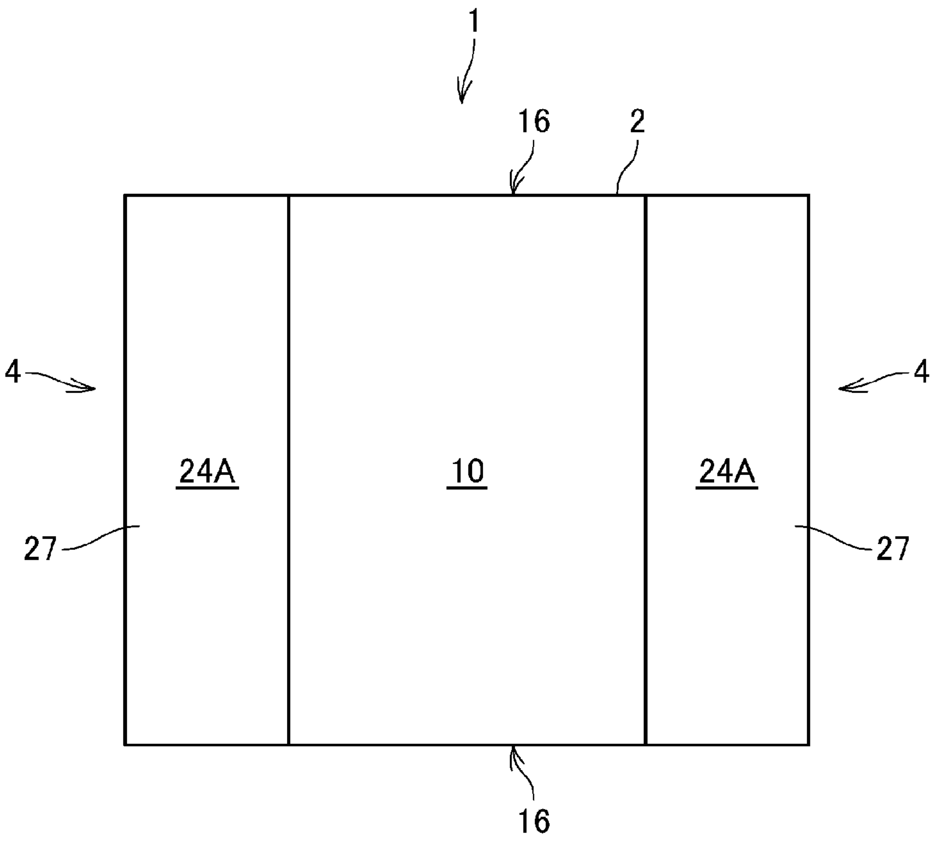
FIG. 4 is a plan view of a mounting surface of the inductor.

FIG. 1 is a perspective view when an inductor 1 according to a first embodiment is viewed from an upper surface 12 side. FIG. 2 is a plan view of a side surface 16 of the inductor 1, FIG. 3 is a plan view of an end surface 14 of the inductor 1, and FIG. 4 is a plan view of a mounting surface 10 of the inductor 1.

The inductor 1 of the present embodiment is configured as a surface mount electronic component, and includes an element body 2 having a substantially rectangular parallelepiped shape and a pair of external electrodes 4 provided on the surface of the element body 2.

Hereinafter, in the element body 2, a surface facing a mounting substrate (not illustrated) at the time of mounting is defined as a mounting surface 10 (FIG. 4), a surface facing the mounting surface 10 is referred to as an upper surface 12, a pair of surfaces orthogonal to the mounting surface 10 is referred to as end surfaces 14, and a pair of surfaces orthogonal to the mounting surface 10 and the pair of end surfaces 14 is referred to as side surfaces 16.

As illustrated in FIG. 1, a distance from the mounting surface 10 to the upper surface 12 is defined as a thickness T of the element body 2, a distance between the pair of side surfaces 16 is defined as a width W of the element body 2, and a distance between the pair of end surfaces 14 is defined as a length L of the element body 2.

Figure 5:
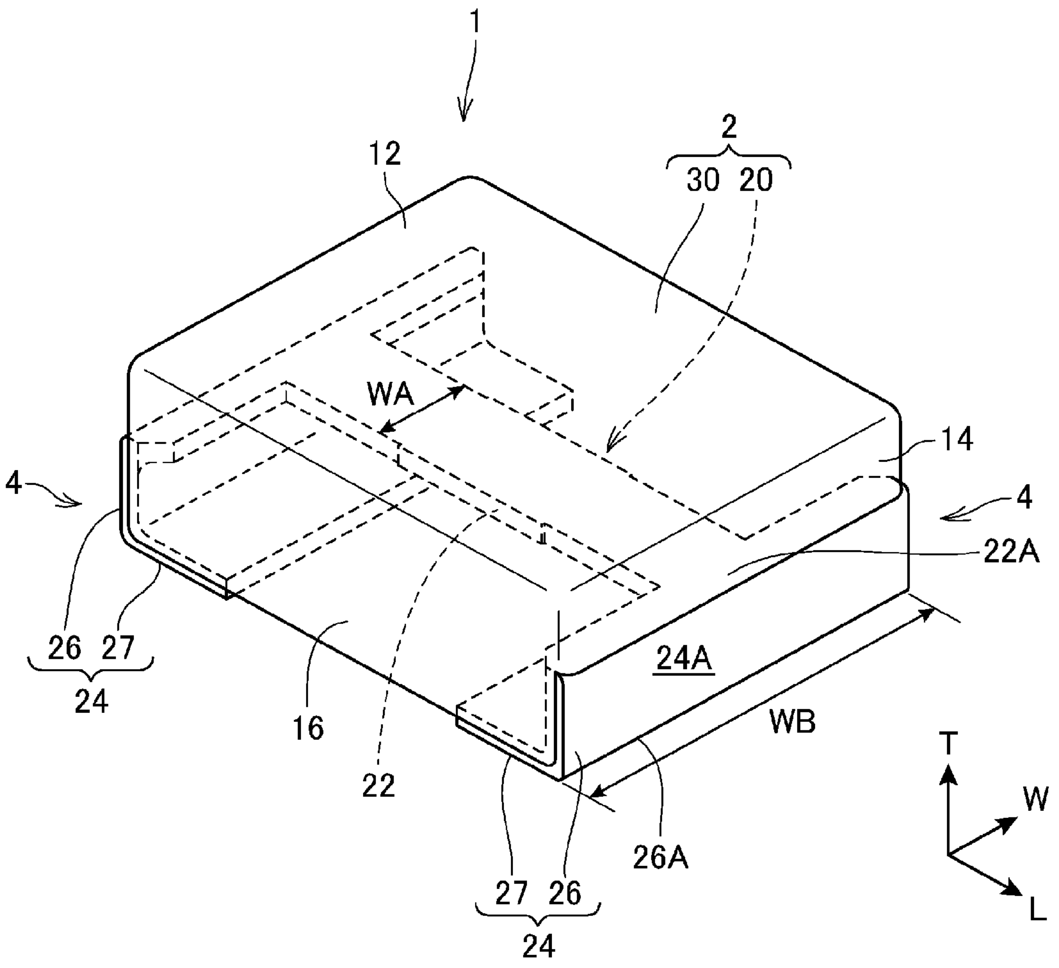
FIG. 5 is a perspective view illustrating an internal configuration of the inductor.

FIG. 5 is a perspective view illustrating an internal configuration of the inductor 1.

The element body 2 includes a conductor 20 and a core 30 having a substantially rectangular shape in which the conductor 20 is embedded, and is configured as a conductor-sealed magnetic component in which the conductor 20 is sealed in the core 30.

The core 30 is a molded body obtained by compression-molding a mixed powder obtained by mixing a magnetic powder and a resin into a substantially rectangular parallelepiped shape by pressurizing and heating the mixed powder in a state where the conductor 20 is incorporated in the core. There is an oxide insulating film oxidized more than the inside of the core 30 on the surface of the core 30. In the mixed powder of the present embodiment, barium sulfate is mixed as a lubricant in addition to the magnetic powder and the resin.

The mixed powder of the present embodiment has a resin amount of about 3.1 wt % with respect to the magnetic powder.

In addition, the magnetic powder of the present embodiment includes particles having two types of particle sizes, that is, large first magnetic particles having a relatively large average particle diameter and small second magnetic particles having a relatively small average particle diameter. During the compression molding, the small second magnetic particles enter between the large first magnetic particles together with the resin, and thus, a filling factor of the core 30 can increase, and magnetic permeability can also increase.

Here, a compounding ratio (weight ratio) of the first magnetic particles and the second magnetic particles is 70:30 to 85:15, preferably 70:30 to 80:20, and 75:25 in the present embodiment.

In addition, a ratio of the average particle diameter of the first magnetic particles to the average particle diameter of the second magnetic particles is preferably 5.0 or more.

Note that the magnetic powder may include particles having an average particle diameter between the average particle diameters of the first magnetic particles and the second magnetic particles, and thus, includes particles having three or more kinds of particle sizes.

In the present embodiment, each of the first magnetic particles and the second magnetic particles is a particle having a metal particle and an insulating film covering the surface the metal particle, the metal particle is made of Fe—Si-based amorphous alloy powder, and the insulating film is made of zinc phosphate. By covering the metal particles with the insulating film, insulating resistance and withstand voltage increase.

In the first magnetic particles, Cr-less Fe—C—Si alloy powder, Fe—Ni—Al alloy powder, Fe—Cr—Al alloy powder, Fe—Si—Al alloy powder, Fe—Ni alloy powder, and Fe—Ni—Mo alloy powder may be used as the metal particles.

In the first magnetic particles and the second magnetic particles, another phosphate (magnesium phosphate, calcium phosphate, manganese phosphate, cadmium phosphate, or the like) or a resin material (silicone-based resin, epoxy-based resin, phenol-based resin, polyamide-based resin, polyimide-based resin, polyphenylene sulfide-based resin, and the like) may be used for the insulating film.

In the mixed powder of the present embodiment, an epoxy resin containing a bisphenol A type epoxy resin as a main agent is used as a material of the resin.

The epoxy resin may be a phenol novolak-type epoxy resin.

The material of the resin may be other than the epoxy resin, and may be two or more kinds instead of one kind. For example, as the material of the resin, a thermosetting resin such as a phenol resin, a polyester resin, a polyimide resin, or a polyolefin resin can be used in addition to the epoxy resin.

As illustrated in FIG. 5, the conductor 20 includes a conductive wire portion 22 extending inside the core 30 over the pair of end surfaces 14, and an electrode portion 24 integrally formed at both ends of the conductive wire portion 22.

A surface 24A of the electrode portion 24 is exposed from each of the end surface 14 of the core 30 and the mounting surface 10, and nickel (Ni) plating and tin (Sn) plating are sequentially applied to the surfaces 24A to form the external electrode 4 in order to secure mountability. Then, the external electrode 4 formed on the mounting surface 10 is electrically connected to a wire of a circuit board by appropriate mounting means such as solder.

In the present embodiment, as illustrated in FIGS. 1 to 5, the electrode portion 24 of the conductor 20 is embedded in the core 30 in a state where only the surface 24A is substantially exposed on the mounting surface 10 and the end surface 14, and thus, an amount of protrusion of the electrode portion 24 from the core 30 is suppressed. As a result, since it is hardly necessary to consider the protrusion of the electrode portion 24, the core 30 can be made as large as a specified size of the inductor 1, and the inductor 1 having a small size and a low height but high performance can be realized.

When a length of the conductive wire portion 22 in the direction of the width W of the core 30 is defined as a conductive wire portion width WA and a length of the electrode portion 24 is defined as an electrode width WB, as illustrated in FIG. 5, the electrode width WB of the electrode portion 24 of the present embodiment is wider than the conductive wire portion width WA, and the resistance in DC resistance is reduced.

The electrode portion 24 is formed in a substantially L shape in an LT cut surface on an LT plane including the respective directions of a length L and a thickness T of the core 30.

Specifically, the electrode portion 24 includes a first electrode portion 26 that extends while being bent substantially vertically at the end portion 22A of the conductive wire portion 22 and a second electrode portion 27 that extends while being bent substantially vertically at a lower end portion 26A of the first electrode portion 26, and the first electrode portion 26 and the second electrode portion 27 form an L shape. The surfaces 24A of the first electrode portion 26 and the second electrode portion 27 are exposed from the end surface 14 and the mounting surface 10 of the core 30 to constitute the external electrode 4.

According to the electrode portion 24, as compared with a case where the conductive wire portion 22 and the electrode portion 24 (external electrode 4) are configured separately, since there is no joint surface between the conductive wire portion 22 and the electrode portion 24 (external electrode 4) which are low electrical resistance regions where a current mainly flows in the external electrode 4, a resistance value can be suppressed, and a large current can flow.

Furthermore, the conductor 20 of the present embodiment is formed of tough pitch copper, and allows a larger current to flow.

Based on the above configuration, the inductor 1 according to the present embodiment has an inductance value of about 10 nH or more in a size of about 2.5 mm in length L, about 2.0 mm in width W, and about 1.0 mm in thickness T, and is capable of achieving performance of about 0.85 mΩ or less in DC resistance, 15 A or more in rated current for temperature rise (when the temperature rises by 40° C.), and 15 A or more in DC superposed current (when the frequency is 1 MHz).

The inductor 1 is used as a power supply circuit including a charge pump type DC-DC converter that boosts a voltage by a capacitor and a switch and an LC filter, and an impedance matching coil (matching coil) of a high frequency circuit, and is used for electronic devices such as a personal computer, a DVD player, a digital camera, a TV, a mobile phone, a smartphone, car electronics, and medical/industrial machines. However, the application of the inductor 1 is not limited thereto, and the inductor 1 can also be used for, for example, a tuning circuit, a filter circuit, a rectifying and smoothing circuit, and the like.

In the inductor 1, an element-body protective layer may be formed on the entire surface of the element body 2 excluding the range of the external electrode 4. As a material of the element-body protective layer, for example, a thermosetting resin such as an epoxy resin, a polyimide resin, or a phenol resin, or a thermoplastic resin such as a polyethylene resin or a polyamide resin can be used. These resins may further contain a filler containing silicon oxide, titanium oxide, or the like.

Figure 6:
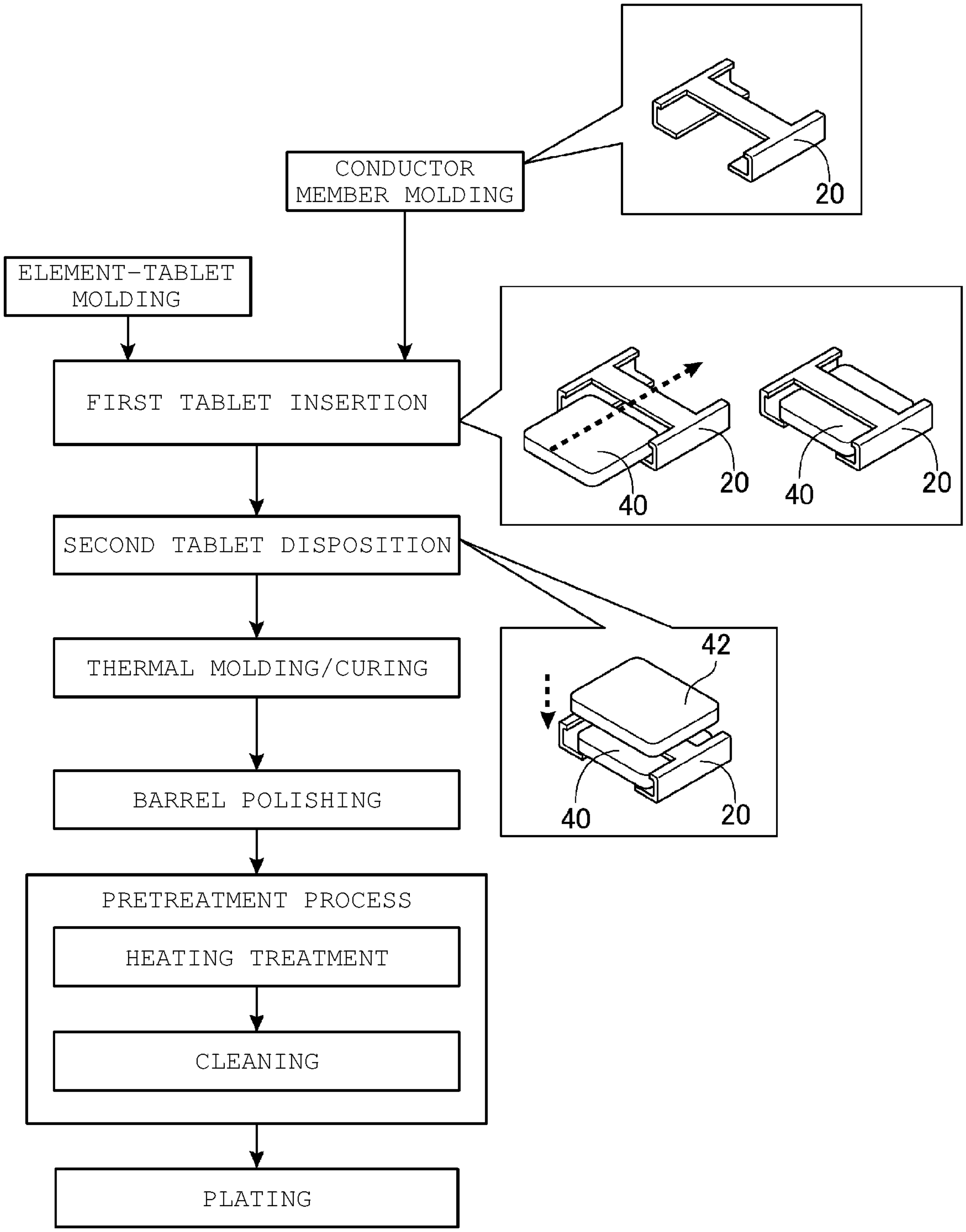
FIG. 6 is a schematic diagram of a manufacturing process of the inductor.

FIG. 6 is a schematic diagram of a manufacturing process of the inductor 1.

As illustrated in the drawing, the manufacturing process of the inductor 1 includes a conductor member molding process, an element-body tablet molding process, a first tablet inserting process, a second tablet disposing process, a thermal molding/curing process, a barrel polishing process, a pretreatment process, and a plating process.

The conductor member molding process is a process of molding the conductor 20.

In the present embodiment, first, a copper piece having a predetermined shape is formed by punching a copper plate having a predetermined thickness, and then the conductor 20 is formed by bending the copper piece. In this case, the first electrode portion 26 and the second electrode portion 27 of the electrode portion 24 are also bent. That is, by this conductor member molding process, the conductor 20 is formed which integrally includes the conductive wire portion 22 and the electrode portion 24 and in which the first electrode portion 26 and the second electrode portion 27 of the electrode portion 24 are also molded in advance (that is, preformed) before being embedded in the core 30.

The tablet molding process is a process of molding two preform bodies of a first tablet 40 and a second tablet 42.

The preform body is molded into a solid state which is easy to handle by pressurizing the mixed powder which is a material of the element body 2. Each of the first tablet 40 and the second tablet 42 is a preform body disposed on a lower side and an upper side of the conductive wire portion 22 of the conductor 20, and is molded in a substantially plate shape.

The first tablet inserting process is a process of inserting the first tablet 40 between the pair of electrode portions 24 on the lower side of the conductive wire portion 22 of the conductor 20 after setting the conductor 20 in a molding die. More specifically, the conductor 20 is provided with the electrode portion 24 having an L shape in the LT section at both end portions 22A of the conductive wire portion 22, and thus, the LT section has a substantially C shape, and the first tablet 40 is inserted into a space surrounded by the conductive wire portion 22 and the pair of electrode portions 24.

The second tablet disposing process is a process of placing the second tablet 42 on the conductive wire portion 22 of the conductor 20.

In the thermal molding/curing process, the first tablet 40, the conductor 20, and the second tablet 42 are integrated by applying heat to the first tablet 40 and the second tablet 42 set in the molding die while pressurizing the first tablet 40 and the second tablet 42 in an overlapping direction of the first tablet 40 and the second tablet 42 and curing them. As a result, a molded body including the conductor 20 is molded.

As described above, since the first tablet 40 is molded in a state of being accommodated in the space surrounded by the conductive wire portion 22 and the pair of electrode portions 24, the conductive wire portion 22 is embedded in the molded body, and the molded body in which the surface of the electrode portion 24 including the first electrode portion 26 and the second electrode portion 27 is exposed to be substantially flush with the core 30 is obtained. In addition, since the first electrode portion 26 and the second electrode portion 27 of the electrode portion 24 are formed in the conductor member molding process in advance, processing for forming the first electrode portion 26 and the second electrode portion 27 is not required for the molded body after molding.

The barrel polishing process is a process of barrel polishing the molded body, and a corner portion of the molded body is rounded by the process.

The pretreatment process is a pretreatment performed for plating the surface 24A of the electrode portion 24, and includes a heating process and a cleaning process.

The heating process is a process of heating the molded body after the barrel polishing to oxidize the surface of the molded body.

The cleaning process is a process of cleaning the surface 24A of the electrode portion 24 by immersing (that is, by wet etching) the molded body in a liquid agent that dissolves only the members of the electrode portion 24 (conductor 20).

The plating process is a process of sequentially applying nickel (Ni) plating and tin (Sn) plating on the surface 24A of the electrode portion 24 by barrel plating. Here, since the surface of the molded body is oxidized in the heating process, in the plating process, occurrence of so-called "plating elongation" in which plating extends from the surface 24A of the electrode portion 24 to the surface of the molded body is suppressed.

Next, the internal configuration of the inductor 1 will be described in detail.

Figure 7:
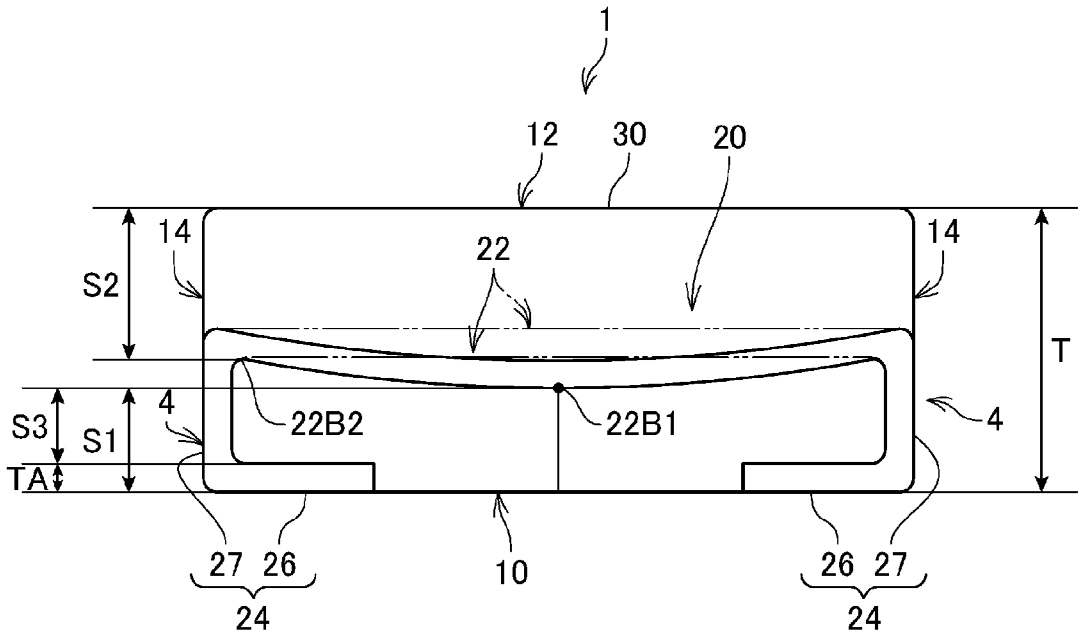
FIG. 7 is an LT sectional view of the inductor.

FIG. 7 is an LT sectional view of the inductor 1.

The LT sectional shape of the inductor 1 (core 30) is a substantially rectangular shape having the thickness T as a short side and the length L as a long side.

In addition, the conductor 20 includes the conductive wire portion 22 extending between the pair of end surfaces 14 and an electrode portion 24 connected to both end portions 22A of the conductive wire portion 22, and the electrode portion 24 extends along the end surface 14 and the mounting surface 10, and thus, the conductor 20 has a substantially C shape opened on the mounting surface 10 side in the LT section.

The conductive wire portion 22 is curved toward the mounting surface 10 side when viewed from the side surface 16 (LT surface) by pressurization in the thermal molding/curing process. Bending deformation of the conductive wire portion 22 due to the pressurization will be described later.

Figure 8:
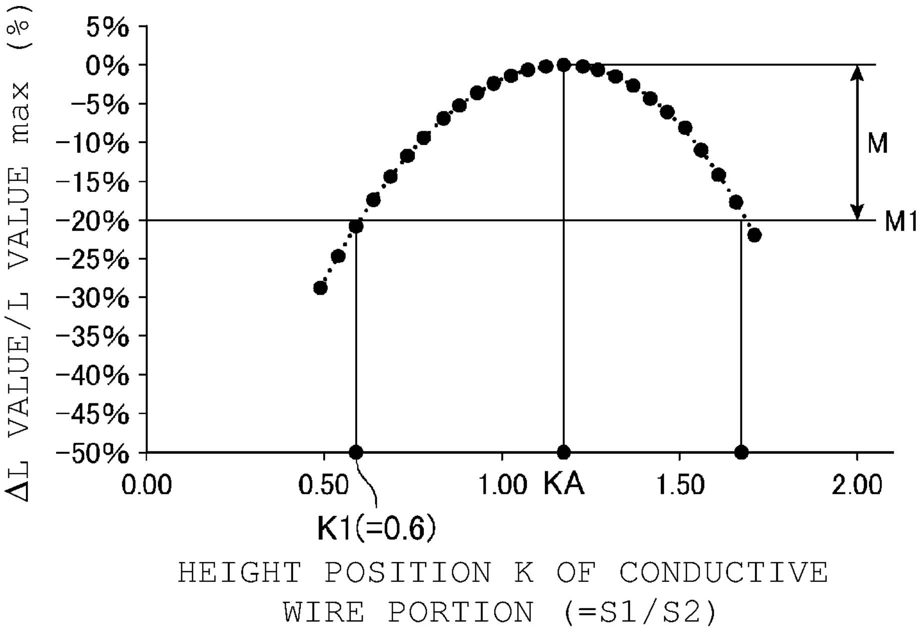
FIG. 8 is a diagram illustrating a relationship between a height position of a conductive wire portion and an inductance value in an LT section.

FIG. 8 is a diagram illustrating a relationship between the height position K of the conductive wire portion 22 in the LT section and the inductance value.

FIG. 8 is a result of simulation analysis, and a horizontal axis indicates the height position K of the conductive wire portion 22 by the ratio between the first distance S1 and the second distance S2. As illustrated in FIG. 7, the first distance S1 is the shortest distance from the bottom surface 22B of the conductive wire portion 22 to the mounting surface 10, and the second distance S2 is the shortest distance from the upper surface 12 to the bottom surface 22B of the conductive wire portion 22.

In addition, a vertical axis in FIG. 8 represents a rate of change in the inductance value, a "ΔL value" represents a decrease value from the maximum inductance value, and an "L value max" represents the maximum inductance value of the inductor 1.

When the conductive wire portion 22 is curved and deformed, the first distance S1 is a distance from a first location 22B1, which is the lowest location (the location closest to the mounting surface 10) on the bottom surface side of the conductive wire portion 22, to the mounting surface 10, and a third distance S3 is a distance from the first location 22B1 to the second electrode portion 27. In addition, the second distance S2 is a distance from the second location 22B2, which is the highest location (the location closest to the upper surface 12) on the bottom surface side of the conductive wire portion 22, to the upper surface 12.

In the inductor 1 according to the present embodiment, the first location 22B1 is located substantially at the center of the conductive wire portion 22 in a longitudinal direction, and the second location 22B2 is located at the end portion 22A of the conductive wire portion 22.

As illustrated in FIG. 8, it can be seen that the inductance value changes in an upwardly convex quadratic function with the height position K of the conductive wire portion 22 as a variable, and the maximum inductance value is obtained at the predetermined height position KA.

In the present embodiment, each of the thickness T of the core 30, the first distance S1, and the second distance S2 is designed so that the conductive wire portion 22 is disposed at the predetermined height position KA when the conductive wire portion 22 is linear without being curved and deformed.

However, the conductive wire portion 22 is curved as indicated by a virtual line in FIG. 7 by pressurization in the thermal molding/curing process of the inductor 1, and the conductive wire portion 22 is formed in a state of being shifted from the predetermined height position KA.

More specifically, in the thermal molding/curing process, pressure is applied to the first tablet 40 and the second tablet 42 disposed above and below the conductor 20 having the preformed electrode portion 24 in the overlapping direction of the first tablet 40 and the second tablet 42. By this pressurization, the first tablet 40 and the second tablet 42 collapse, and the mixed powder flows so as to fill the gap in the cavity of the molding die.

Meanwhile, in the present embodiment, in order to reliably insert the second tablet 42 disposed on the lower side of the conductor 20 into the space surrounded by the conductive wire portion 22 and the pair of electrode portions 24, the second tablet 42 is formed in advance to have a size in which a slight gap is generated between the space and the second tablet 42. Therefore, a relatively larger number of gaps exist on the lower side of the conductive wire portion 22 than the upper side thereof, and the flow of the mixed powder from the upper side to the lower side of the conductive wire portion 22 occurs at the time of pressurization due to the deviation of the upper and lower gaps. When the flow acts on the conductive wire portion 22, the conductive wire portion 22 is curved toward the lower mounting surface 10 as indicated by a virtual line in FIG. 7.

When the conductive wire portion 22 is curved, the first distance S1 becomes relatively small with respect to the second distance S2, and thus, the height position K of the conductive wire portion 22 becomes lower than the predetermined height position KA, and as illustrated in FIG. 8, the inductance value monotonously decreases from the maximum inductance value according to the decrease in the height position K.

As can be seen from FIG. 8, a decreasing rate of the inductance value and the height position K have a one-to-one relationship. Therefore, when the maximum inductance value (that is, the inductance value in a state where there is no curvature) is the inductance value required in the specification, the decreasing rate of the inductance value with respect to the specification can be specified by the height position K (that is, the amount of curvature) of the conductive wire portion 22, and can be used for management of the inductance value. In addition, yield in manufacturing is improved by allowing the bending.

Specifically, when the height position K falls within a predetermined range between the minimum height position K1 corresponding to a lower limit M1 of an allowable range M of the inductance value and the predetermined height position KA from which the maximum inductance value is obtained, it can be determined that the inductance value falls within the allowable range M of the specification.

In the inductor 1 of the present embodiment, various dimensions (thickness T of core 30, first distance S1, second distance S2, and the like) are designed with the inductance value required in the specification as the maximum inductance value, the height position K of the conductive wire portion 22 after molding falls within the predetermined range, and thus, the inductance value is reliably within the allowable range M of the specification.

In the present embodiment, the lower limit M1 of the allowable range M has a decreasing rate of the inductance value of 20%, and the minimum height position K1 corresponding to the lower limit M1 is "0.6".

Therefore, by forming the minimum height position K1 of the conductive wire portion 22 at 0.6 or more (the maximum value is the predetermined height position KA), it is possible to obtain the inductor 1 having a small size with the length L of about 2.5 mm and the width W of about 2.0 mm, and having a quality in which the decreasing rate of the inductance value from the specification is suppressed to 20% at the maximum while having a low height with the thickness T of about 1 mm.

Here, as described above, the curvature of the conductive wire portion 22 is caused by the flow of the mixed powder from the upper side to the lower side of the conductive wire portion 22, and the flow is mainly caused by the size of the first tablet 40 inserted into the lower side of the conductive wire portion 22. Therefore, a degree of flow is controlled by adjusting the size of the first tablet 40 (clearance between the conductive wire portion 22 and the electrode portion 24) within a range in which the insertability of the conductive wire portion 22 to the lower side is not impaired, and the amount of curvature of the conductive wire portion 22 due to the flow can be adjusted so that the height position K of the conductive wire portion 22 falls within the range from the lowest height position K1 to the predetermined height position KA.

In addition, since the first tablet 40 functions as a member that supports the bottom surface 22B side of the conductive wire portion 22 at the time of pressurization, the amount of curvature of the conductive wire portion 22 can be more effectively controlled by adjusting the thickness (clearance between the conductive wire portion 22 and the first tablet 40) of the first tablet 40.

According to the present embodiment, the following effects are obtained.

An inductor 1 of the present embodiment is an inductor 1 in which the conductor 20 is embedded in the core 30 containing magnetic powder, and the core 30 includes the mounting surface 10 facing the mounting substrate side at the time of the mounting, the upper surface 12 facing the mounting surface 10, the pair of end surfaces 14 orthogonal to the mounting surface 10, and the pair of side surfaces 16 orthogonal to the mounting surface 10 and the pair of end surfaces 14. In addition, the conductor 20 includes the conductive wire portion 22 extending inside the core 30 over the pair of end surfaces 14 and the electrode portion 24 led out from each of the end surfaces 14 and extending along the end surface 14 and the mounting surface 10, and the conductive wire portion 22 is curved toward the mounting surface 10 side in side view of the core 30.

According to this configuration, the yield in manufacturing is improved by allowing the bending of the conductive wire portion 22, and the decrease in the inductance value can be kept within the allowable range M of the specification by managing the amount of bending.

In the inductor 1 according to the present embodiment, the height position K of the conductive wire portion 22 is defined by the ratio of the first distance S1 from the first location 22B1 to the mounting surface 10 of the core 30 to the second distance S2 from the second location 22B2, which is the closest location to the upper surface 12 of the core 30 in the bottom surface 22B of the conductive wire portion 22, to the upper surface 12, and the value of the first distance S1/the second distance S2 is "0.6" or more.

As a result, it is possible to obtain the inductor 1 having a quality in which the decreasing rate of the inductance value from the specification is suppressed to 20% at the maximum while the thickness T of the core 30 is as small as about 1 mm.

Note that the above-described embodiment is merely an example of one aspect of the present disclosure, and can be arbitrarily modified and applied without departing from the gist of the present disclosure.

The directions such as horizontal and vertical directions, various numerical values, shapes, and materials in the above-described embodiment include a range (so-called equivalent range) in which the same functions and effects as those of the directions, numerical values, shapes, and materials are exhibited unless otherwise specified.

Figure 9:
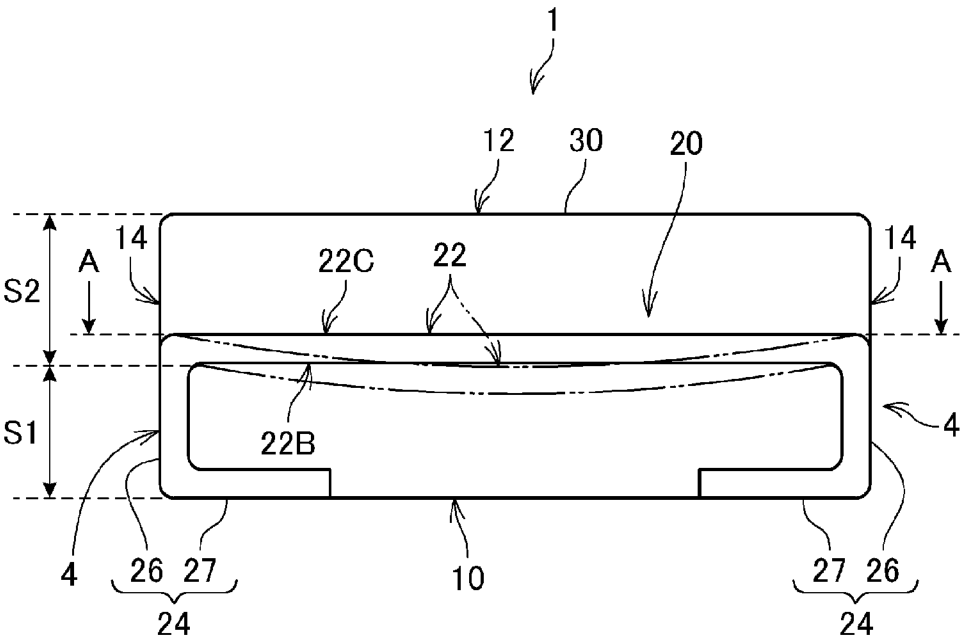
FIG. 9 is an LT sectional view of an inductor according to a second embodiment of the present disclosure.

FIG. 9 is an LT sectional view of an inductor 1 according to a second embodiment of the present disclosure.

The LT sectional shape of the inductor 1 (core 30) is a substantially rectangular shape having the thickness T as a short side and the length L as a long side.

In addition, a conductor 20 includes a conductive wire portion 22 extending linearly in a direction of the length L substantially parallel to a mounting surface 10 corresponding to a bottom surface at the time of the mounting, and electrode portions 24 connected to both end portions 22A of the conductive wire portion 22, each of the electrode portion 24 extends along an end surface 14 and the mounting surface 10, and thus, the conductor 20 has a substantially C shape opened on the mounting surface 10 side in the LT section.

Figure 10:
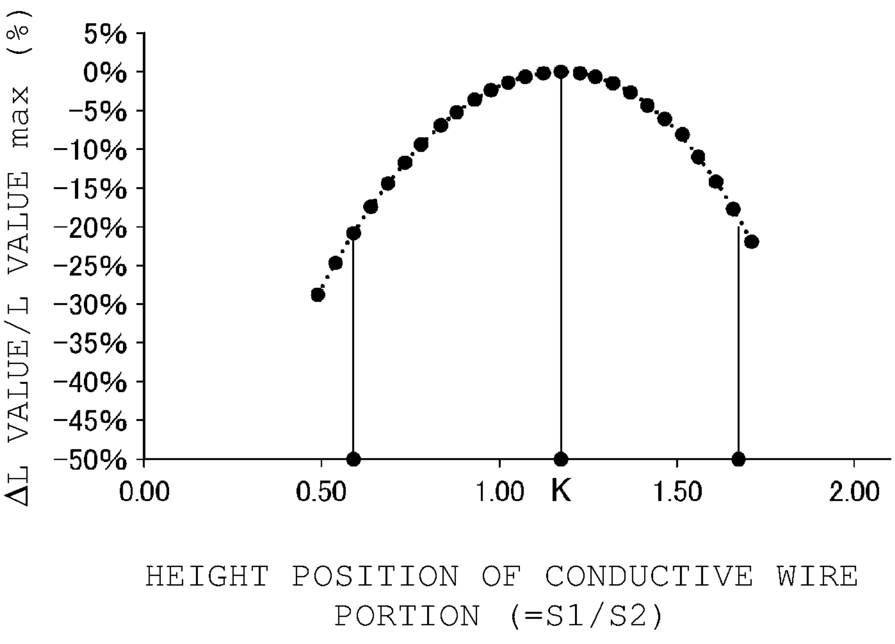
FIG. 10 is a diagram illustrating a relationship between a height position of a conductive wire portion and an inductance value in an LT section.

FIG. 10 is a diagram illustrating a relationship between a height position of the conductive wire portion 22 in the LT section and an inductance value.

FIG. 10 is a result of simulation analysis, and a horizontal axis indicates the height position of the conductive wire portion 22 by a ratio between a first dimension S1 and a second dimension S2. As illustrated in FIG. 9, the first dimension S1 is a distance from the mounting surface 10 to a bottom surface 22B of the conductive wire portion 22, and the second dimension S2 is a distance from an upper surface 12 to the bottom surface 22B of the conductive wire portion 22.

In a vertical axis of FIG. 10, a "ΔL value" means a decrease value from the maximum inductance value, and an "L value max" means the maximum inductance value.

As illustrated in FIG. 10, it can be seen that the inductance value changes in an upwardly convex quadratic function with the height position of the conductive wire portion 22 as a variable, and the maximum inductance value is obtained at the predetermined height position K. In the present embodiment, the dimensions of the core 30 and the conductor 20 are designed such that the conductive wire portion 22 is disposed at the predetermined height position K.

However, when the conductive wire portion 22 is deformed into an arcuate shape as indicated by a virtual line in FIG. 9 at the time of molding the core 30, the conductive wire portion 22 may deviate from the predetermined height position K, the inductance value may decrease, and a DC superimposed current may also decrease.

More specifically, the inductor 1 according to the present embodiment is molded as follows. That is, as illustrated in FIG. 6, first, in a first tablet inserting process and a second tablet disposing process, a first tablet 40 and a second tablet 42 are disposed above and below the conductor 20 in which the electrode portion 24 is preformed, and in the subsequent thermal molding/curing process, pressure is applied in an overlapping direction of the first tablet 40 and the second tablet 42. By this pressurization, the first tablet 40 and the second tablet 42 collapse, and the mixed powder constituting each of them flows so as to fill the gap in a cavity of a molding die.

Meanwhile, in the present embodiment, in order to reliably insert the second tablet 42 disposed on the lower side of the conductor 20 into the space surrounded by the conductive wire portion 22 and the pair of electrode portions 24, the second tablet 42 is formed in advance to have a size in which a slight gap is generated between the space and the second tablet 42. Therefore, a relatively large number of voids exist on the lower side of the conductive wire portion 22 than the upper side thereof, and the mixed powder flows from the upper side to the lower side of the conductive wire portion 22 at the time of pressurization. When the flow acts on the conductive wire portion 22, the conductive wire portion 22 is deformed in an arcuate shape toward the lower mounting surface 10 as indicated by a virtual line in FIG. 9.

When the conductor 20 in which the electrode portion 24 is not preformed, that is, the conductor 20 in which the end portion 22A of the conductive wire portion 22 is not bent is used at the time of molding, it is not necessary to reduce the size of the second tablet 42. Therefore, in this case, by appropriately increasing the size of the second tablet 42 as compared with the present embodiment, it is possible to eliminate the difference between the gap on the upper side and the gap on the lower side of the conductive wire portion 22 and to prevent the flow from generating the arcuate deformation in the conductive wire portion 22. However, when the conductor 20 that is not preformed is used for molding, the electrode portion 24 of the conductor 20 is bent after the core 30 is molded to form the first electrode portion 26 and the second electrode portion 27. Therefore, the first electrode portion 26 and the second electrode portion 27 protrude from the surface of the core 30 (element body 2), and the inductor 1 is increased in size by the thickness of the first electrode portion 26 and the second electrode portion 27 (the plate thickness of the conductor 20), which makes it difficult to reduce the size.

The conductor 20 of the present embodiment has a configuration for suppressing arcuate deformation of the conductive wire portion 22, and such a configuration will be described in detail below.

Figure 11:
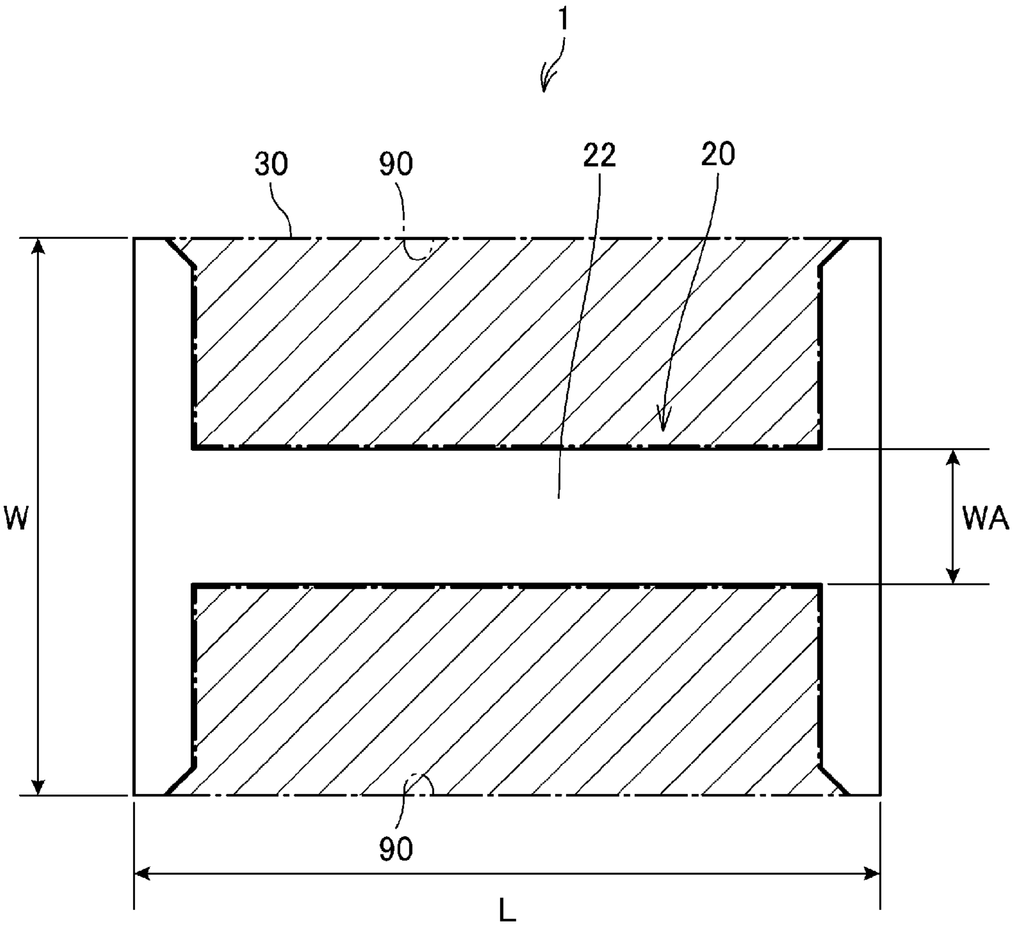
FIG. 11 is a sectional view taken along line A-A in FIG. 9.

FIG. 11 is a sectional view taken along line A-A of FIG. 9.

An A-A cut surface is a cut surface obtained by cutting the element body 2 at a surface (more precisely, a surface including the upper surface 22C of the conductive wire portion 22) including the conductive wire portion 22 of the conductor 20. As illustrated in the drawing, in the cut surface, a gap 90 connecting the upper surface 12 side of the element body 2 and the mounting surface 10 side of the element body 2 is present inside the core 30 on both sides sandwiching the conductive wire portion 22.

At the time of pressurization in the thermal molding/curing process, the mixed powder flows from the upper side to the lower side of the conductive wire portion 22 in the LT sectional view through the gap 90. A force received by the conductive wire portion 22 due to such flow is changed depending on the degree of flow, and the degree of flow is changed depending on the size of the gap 90. Specifically, the larger the gap 90 is, the better the fluidity is, the force acting on the conductive wire portion 22 is reduced, and the arcuate deformation is suppressed. Therefore, by forming the gap 90 with a size that suppresses the flow to such an extent that the arcuate deformation hardly occurs in the conductive wire portion 22, it is possible to prevent the arcuate deformation of the conductive wire portion 22 or suppress the deterioration of the inductance value to an extent that falls within an allowable range.

The size of the gap 90 can be indicated by a ratio of the total area of each gap 90 to an element body area (=L×W) obtained by integrating the length L and the width W of the element body 2. The total area of each gap 90 is an area obtained by subtracting the area of the conductive wire portion 22 from the element body area. Hereinafter, the total area of each gap 90 is referred to as an opening area, and a ratio of the opening area to the element body area is referred to as an opening area ratio.

The degree of flow of the mixed powder at the time of pressurization is also changed depending on viscosity of the mixed powder at that time, and the arcuate deformation is also changed depending on the difference in viscosity.

The inductor 1 of the present embodiment is molded using a mixed powder having a complex viscosity $\eta^*$ of $1.2\times10^6$ [Pa·s] at a temperature of 107.5° C., and the conductor 20 is the element body 2 in which the thickness of the conductive wire portion 22 (the length between the upper surface 22C and the bottom surface 22B) is 0.1 mm and the conductive wire portion width WA is 0.48 mm Since the opening area ratio is 62%, the inductor 1 in which the arcuate deformation of the conductive wire portion 22 at the time of molding is suppressed is obtained.

In addition, the inventor has confirmed through experiments that in the inductor 1, when the thickness of the conductive wire portion 22 is in the range of 0.1 mm or less and the viscosity is in the range of $1.1\times10^6$ to $1.3\times10^6$ [Pa·s], the arcuate deformation of the conductive wire portion 22 is suppressed by the opening area ratio being in the range of 57% to 73%.

In this experiment, the complex viscosity $\eta^*$ of the mixed powder was measured using a rheometer (manufactured by Thermo Fisher Scientific, model number: MARS 60).

The element body area and the opening area were obtained based on an X-ray fluoroscopic image obtained by fluoroscopically viewing the element body 2 from the upper surface 12 using an X-ray. Specifically, the element body area was determined by the area occupied by the element body 2 in the X-ray fluoroscopic image. In addition, the area occupied by the conductive wire portion 22 in the X-ray fluoroscopic image was obtained, and the area occupied by the conductive wire portion 22 was subtracted from the element body area to obtain the value as the opening area.

According to the present embodiment, the following effects are obtained.

The inductor 1 of the present embodiment includes the element body 2 in which the conductor 20 is embedded in the core 30 containing magnetic powder. The element body 2 has the mounting surface 10 facing the mounting substrate side at the time of the mounting, the upper surface 12 facing the mounting surface 10, and the pair of end surfaces 14 orthogonal to the mounting surface 10 and facing each other. In addition, the conductor 20 includes the conductive wire portion 22 extending inside the core 30 of the element body 2 over the pair of end surfaces 14, and the pair of electrode portions 24 led out from each of the pair of end surfaces 14 and extending along the end surface 14 and the mounting surface 10. Then, the ratio of the opening area, which is a value obtained by subtracting the area occupied by the conductive wire portion 22 in the X-ray fluoroscopic image from the element body area, to the element body area, which is the area occupied by the element body 2 in the X-ray fluoroscopic image obtained by fluoroscopically viewing the element body 2 from the upper surface 12 by X-rays is 57% to 73%.

As a result, though the mixed powder flows due to pressurization in the thermal molding/curing process, it is possible to suppress the arcuate deformation of the conductive wire portion 22, suppress the decrease in the inductance value, and suppress the decrease in the DC superimposed current.

Note that the above-described embodiment is merely an example of one aspect of the present disclosure, and can be arbitrarily modified and applied without departing from the gist of the present disclosure.

In the above-described embodiment, the gaps 90 on both sides in the width direction of the conductive wire portion 22 of the conductor 20 may be different in size (area) and shape.

(Supplement)

An inductor having an element body in which a conductor is embedded in a core containing magnetic powder, in which the element body includes a mounting surface facing a mounting substrate side at a time of mounting, an upper surface facing the mounting surface, and a pair of end surfaces orthogonal to the mounting surface and facing each other, the conductor includes a conductive wire portion extending inside the core of the element body over the pair of end surfaces and a pair of electrode portions led out from each of the end surfaces and extending along the end surface and the mounting surface, and a ratio of an opening area to an element body area is 57% to 73%, wherein the element body area is an area occupied by the element body in the fluoroscopic image obtained by fluoroscopically viewing the element body from the upper surface, and the opening area is an area obtained by subtracting an area occupied by the conductive wire portion from the element body area in the fluoroscopic image.

In the above-described embodiment, the conductive wire portion 22 of the conductor 20 may extend while meandering so as to draw a letter S in top view, for example, instead of having a shape extending linearly between the pair of end surfaces 14.

The directions such as horizontal and vertical directions, various numerical values, shapes, and materials in the above-described embodiment include a range (so-called equivalent range) in which the same functions and effects as those of the directions, numerical values, shapes, and materials are exhibited unless otherwise specified.

What is claimed is:

1. An inductor comprising:

a core containing magnetic powder, and a conductor which is embedded in the core, wherein the core includes a mounting surface facing a mounting substrate side at a time of mounting, an upper surface facing the mounting surface, a pair of end surfaces orthogonal to the mounting surface, and a pair of side surfaces orthogonal to the mounting surface and the pair of end surfaces, the conductor includes a conductive wire portion extending inside the core over the pair of end surfaces and a respective electrode portion led out from each of the end surfaces and extending along the mounting surface and a respective one of the end surfaces, the conductive wire portion is curved toward the mounting surface when the core is viewed from one of the side surfaces, and an uppermost surface of the electrode portion of the conductor at each of the respective end surfaces is further away from the mounting surface in a direction normal to the mounting surface than any portion of the conductor along the center of the core.

2. The inductor according to claim 1, wherein a height position of the conductive wire portion is defined by a ratio of a first distance from a first location of the conductive wire portion to the mounting surface and a second distance from a second location of the conductive wire portion to the upper surface, the first location is a location of the conductive wire portion closest to the mounting surface of the core on a bottom surface side of the conductive wire portion, the second location is a location of the conductive wire portion closest to the upper surface of the core on the bottom surface side of the conductive wire portion, and a value of the first distance/the second distance is 0.6 or more.

* * * * *